United States Patent [19]

Torigai et al.

[11] 4,080,062

[45] Mar. 21, 1978

[54] VARIABLE MAGNIFICATION OPTICAL MECHANISM

[75] Inventors: Akiyoshi Torigai; Tadashi Sato, both of Tokyo; Hidetoshi Tanaka, Tokyo; Toshirou Kasamura, Kawasaki; Masashi Suda, Iruma, all of Japan

[73] Assignee: Canon Kabushiki Kaisha, Tokyo, Japan

[21] Appl. No.: 744,711

[22] Filed: Nov. 24, 1976

[51] Int. Cl.2 ........................ G03B 27/48; G03B 27/70

[52] U.S. Cl. .......................................... 355/49; 355/57

[58] Field of Search ........................ 355/55, 57, 60, 66, 355/47-51, 8, 11

[56] References Cited

U.S. PATENT DOCUMENTS

| | | | |
|---|---|---|---|
| 3,598,489 | 8/1971 | Thomas et al. | 355/57 X |
| 3,614,222 | 10/1971 | Post et al. | 355/8 |
| 3,873,189 | 3/1975 | Whitaker et al. | 355/55 X |
| 3,884,574 | 5/1975 | Dol et al. | 355/66 |
| 3,914,044 | 10/1975 | Ogawa | 355/66 X |
| 3,947,188 | 3/1976 | Simpson | 355/57 X |
| 3,950,090 | 4/1976 | Washio et al. | 355/8 |

*Primary Examiner*—Donald A. Griffin
*Attorney, Agent, or Firm*—Fitzpatrick, Cella, Harper & Scinto

[57] ABSTRACT

The disclosure describes a variable magnification optical mechanism in an image forming apparatus in which a varied image at a selected magnification of an original image is formed. A photosensitive body on which the varied image is exposed is moved at a definite speed (v) irrespective of the selected magnification (m) and optical means for transmitting the image of the original to the photosensitive body is driven at a speed ratio of v/m. The pre-running length (l) of the optical means is changed in accordance with the selected magnification (m) at a ratio of 1/m so that coincidence of the original image and the variation image formed therefrom may be attained every time.

18 Claims, 11 Drawing Figures

VARIABLE MAGNIFICATION OPTICAL MECHANISM

BACKGROUND OF THE INVENTION a. Field of the Invention

The present invention relates to an optical system adapted for image forming apparatus in which image is formed by exposing an image of original to photosensitive body, more particularly relates to a variable magnification optical mechanism or variation optical mechanism for forming copy image of an original at variable magnification including magnification in negative direction, namely minification.

b. Description of the Prior Art

In the art of image forming apparatus provided with variable magnification optical mechanism such as electrostatic copying apparatus, there are known two types of exposure system.

One is of the type in which the entire area of original is exposed to the photosensitive body at a time, which is called "full illumination type".

The other is of the type so called "scanning type" in which the original is successively exposed from one edge to the other at every strip like section having the same width. Practically the latter is more widely employed than the former.

In case of the latter, it is known that a preliminary operation of the optical system is required which is usually called "pre-running". This is because at the starting time of movable optical members such as mirror and original table, there occur vibrations that give adverse effects to the image, for example, make the produced image unclear.

To prevent such adverse effect caused by vibration of mirror or original table at their starting time, they are preliminarily moved in actual exposure step by a predetermined distance enough to have them reached a given operational speed. This additional running of movable part or members is called "pre-running". This is troublesome and unpreferable at any rate. Notwithstanding, however, the scanning type of apparatus has been widely employed and preferred.

This is because it has various advantages adequately enough to compensate for the above mentioned disadvantage. For example, it permits miniaturization of optical system assembly and use of small light source of exposure.

But, if a variation optical mechanism, for example, to minify the image of original is incorporated into such scanning type of optical system, there arises another problem. The problem is that those copy images are produced in which image of the fore edge portion is missing. This is caused by the fact that when a minified copy image is formed, the prerunning of the optical system is prematurely finished relative to the photosensitive body that moves always at the same speed given for copying at 1:1 magnification, and, therefore, imagewise exposure begins already in the course of pre-running.

To solve the problem, it has known and used practically that photosensitive sheet (for FAX type copying apparatus) or transfer sheet (for transfer type copying apparatus) is fed and conveyed with a suitable time delay enough to obtain coincidence. However, there are arranged along the path of photosensitive copy sheet or transfer sheet various elements and members such as control means for sheet feeding and conveying device, control means for transfer sheet separator and blocking detector at fixing station. Due to this fact, control of the necessary time delay mentioned above becomes very complicate and troublesome.

SUMMARY OF THE INVENTION

Accordingly the object of the invention is to provide a variable magnification optical mechanism which enables to prevent the misalignment of fore edge of the image at the time of variation image forming from an original.

Further object of the invention is to provide a variable magnification optical mechanism which eliminates the trouble and disadvantage involved in the prior art system due to the inevitable premature completion of pre-running at the time of variation copying.

Another object of the invention is to provide a variable magnification optical mechanism which allows to rotate or shift the photosensitive member at a definite speed irrespective of a selected magnification and form a high quality image having no missing portion at its edge on a transfer member.

To attain the above objects, the present invention proposes a variable magnification optical mechanism adapted for an image forming apparatus of the type as described above, comprising a photosensitive member moving at a definite speed (v) irrespective of selected magnification, transmission means putting out a driving force in a speed ratio corresponding to a selected magnification (m) and optical means moving at a speed of v/m, with the driving force through said transmission means.

The pre-running length of the optical means is adjusted in accordance with a selected magnification (m) at a rate of 1/m. Herein, the pre-running length l is defined as distance from the starting position of optical means to the fore edge of original from which imagewise exposure should be started. The term "photosensitive member" includes repeatedly usuable, conventional photosensitive body in the form of drum, endless belt or sheet and photosensitive copy sheet used in FAX system.

Further, optical means which necessitates "pre-running" is reflecting means such as mirror for the case wherein a stationary original supporting table or plate is provided. On the contrary, for the case wherein stationary reflecting means such as mirror is provided, it is a movable original supporting table. For example, speaking of a copying apparatus in which a stationary original table is provided and scanning is effected by movable mirror, the mirror vibrates at the commencement of exposure in the direction of scanning while moving due to the adrupt change in speed from rest state to running state. By this vibration, the coincidence of the movement of the photosensitive body and exposed image is greatly disturbed so that unclear and almost valueless copy image may be produced. But, such a vibration continues only for moment and some time after it becomes disappeared. Then, it becomes possible to effect scanning in a stable condition.

For this reason, the optical system is moved preliminarily by some distance prior to entering the actual exposure position. The distance is predetermined and the length of such movement will be referred to hereafter as "pre-running length". For the case of a scanning speed of 150 mm/sec., for example, the pre-running length will be about 40 - 60 mm.

Now the present invention will be explained in detail with reference to the drawings showing the preferred embodiments of the invention.

DESCRIPTION OF PREFERRED EMBODIMENTS

Figure 1:
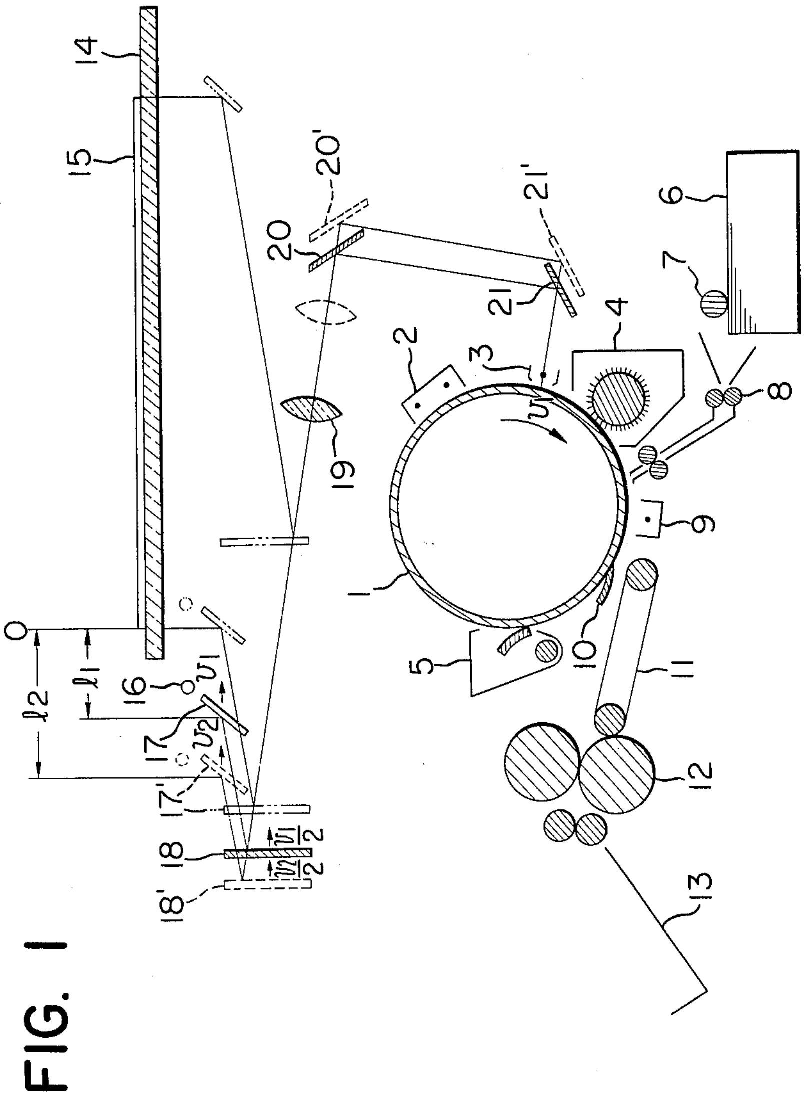
FIG. 1 is a schematic view of an arrangement of copying appartus having a stationary original table and movable illuminating means and reflecting means showing one embodiment of the invention.

Referring to FIG. 1, there is shown in a schematic sectional view a transfer type of electronic copying apparatus with a stationary original supporting plate embodying the present invention. Reference numeral 1 designates a photosensitive body in the shape of a drum which is known, for example, by U.S. Pat. No. 3,666,363 and comprises three layers, namely an electric conductive substrate, a photoconductive intermediate layer and an insulating top layer on the substrate. Reference numerals 2 – 13 designate the following members: 2 is a first corona discharge device, 3 is a second corona discharge device having the function of simultaneous exposure, 4 is a developing device, 5 is a cleaning device, 6 is a stack of transfer sheets, 7 is a sheet feed roller, 8 is registering roller, 9 is a transfer corona discharge device, 10 is a conveyor belt, 12 is a heat roller fixing device and 13 is a sheet discharge tray. Opposed to the photosensitive drum 1, there is an original 15 to be copied, that is, a document placed on the original supporting plate 14. The original 15 is illuminated by a lamp 16 and the reflected image of the original is exposed on the surface of the photosensitive drum 1 by means of a first mirror 17, a second mirror 18, a lens 19 having a driving mechanism, a third mirror 20 and a fourth mirror 21. To form a copy of the original with said apparatus, the photosensitive drum 1 rotating in the direction indicated by the arrow at the rate of $V_1$ is charged by the first corona discharge device 2 and then the image of the document is exposed on the drum while being discharged by the second corona discharge device 3. This exposure of the original is effected by the lamp 16 and the first mirror 17 moving at the rate of $V_1$ relative to the original 15 on the stationary supporting plate 14 made of glass, the second mirror 18 moving at the rate of $V_{1/2}$ in the same direction as the first mirror 17, the lens 19 and the mirrors 20 and 21.

By this exposure step, there is formed on the photosensitive drum 1 an electrostatic latent image, of the original at 1:1 magnification which is then developed by the developing device 4. The developed image is transferred onto the transfer sheet 6 under the action of the electric field produced by corona discharge from the transfer corona discharge device 9. The developed image on the transfer sheet 6 is fixed by the fixing device 12 and finally the sheet 6 is discharged into the sheet discharge tray 13.

When the original has to be copied at a selected magnification which is not 1:1 magnification with the apparatus, the first and second mirrors 17 and 18 are shifted so that their scanning starting positions come to 17' and 18' respectively. At the same time in order to change the imaging magnification, the lens 19 is shifted to the position indicated by the dotted line and also the third and fourth mirrors 20 and 21 are shifted to the positions indicated by the reference numerals 20' and 21' respectively. Provided that the pre-running length of the scanning mirror 17 for 1:1 magnification is $l_1$ and that for the selected magnification $m$ is $l_2$, then $l_2$ will become $l_1$/m. Therefore, the shift of the first mirror 17 is increased by the distance $l_2 - l_1$ compared with that for 1:1 magnification so as to give a lengthened pre-running length in accordance with the magnification change. This makes it possible to form the image of the fore edge position 0 of the original ducument correctly as in case of 1:1 magnification. To form the image of the fore edge of the document always at the same position on the photosensitive drum 1 rotating at the rate of $V_1$ irrespective of the magnification change, it is required that the scanning time t of the original 15 viewed from the drum side should be the same as that for 1:1 magnification. In other words, the requirement for this purpose is only that the relation $t={}_1/V_1=l_2/V_2$ ($V_2$ is the velocity of the first mirror 17 for the given magnification) $m$ and is equal to $V_1/m$, and the velocity of the second mirror 18 is equal to $V_2/2$ should be satisfied and the pre-running length $l_2$ for the selected magnification m should be $l_1$m. Without changing the focal length of the lens 19, the third and fourth mirrors 20 and 21, as well as the lens 19, are shifted to focus the image of the original on the photosensitive drum 1. A conventional transmission mechanism (not shown) may be employed to give the first and second mirrors 17 and 18 the required velocity $V_2$ corresponding to the selected magnification. For example, the mirrors may be connected with a wire cord moving around a pulley rotating at a variable rotational speed in accordance with the given magnification.

Figure 2:
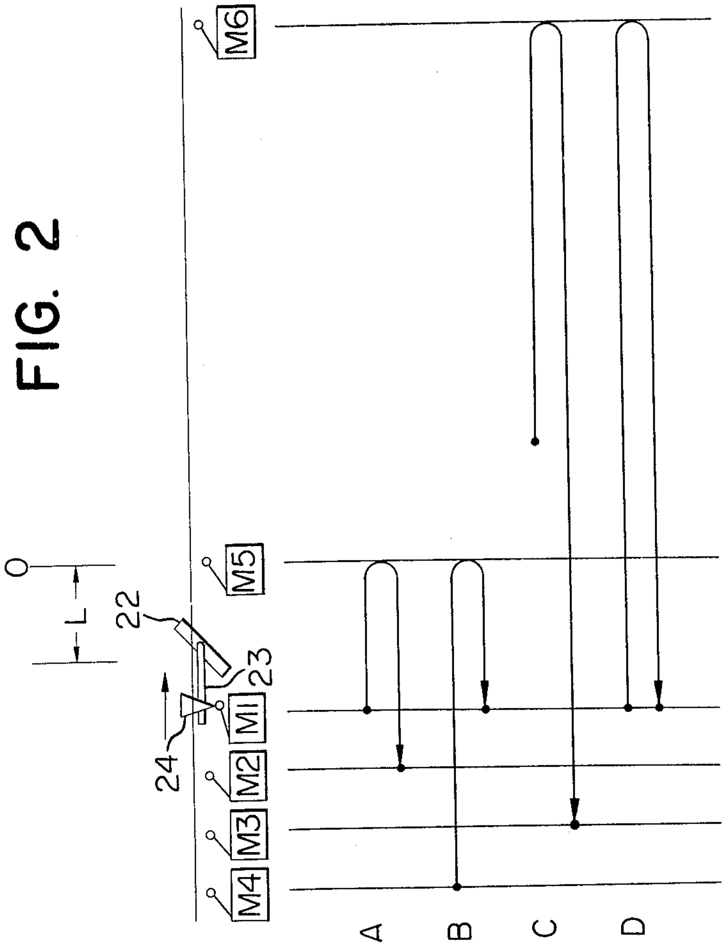
FIG. 2 shows one example of scanning method by a reflecting means in the same type of the apparatus as shown in FIG. 1.

FIG. 2 illustrates the manner how to set the various pre-running positions as well as the corresponding operation of the first mirror in a copying apparatus equipped with a variable magnification system as described above. The copying apparatus shown in FIG. 1 allows to select one of two copy sizes. In contrast with the apparatus of FIG. 1, the copying apparatus of FIG. 2 has a wider selection range. It allows to select the magnification from four kinds of degree, that is, 1:1, 1:0.87, 1:0.82 and 1:0.71.

Now referring to FIG. 2, four operational examples A – D of the first mirror will be explained. The first mirror 22 corresponds to the first mirror 17 of the apparatus shown in FIG. 1. The first mirror 22 is integrally formed with a support 23 on which a cam 24 is fixedly mounted. The first mirror moves the direction indicated by the arrow at a given velocity to scan the original. In FIG. 2 there is not shown for the simplification of the explanation a second mirror which scans the original at a rate of ½ velocity of that of the first one. Microswitches M1 -M6 are opened and closed by the above mentioned cam 24 through the action of the corresponding actuator to detect the position of the first mirror and control the scanning. The position 0 is the position of the fore edge of the document and L in FIG. 2 corresponds to the pre-running length $l_1$ in FIG. 1 and indicates the pre-running length for copying at 1:1 magnification. Here the explanation of the second mirror is omitted for the above reason.

The starting position of the first mirror 22 is determined by the cooperation of one of the microswitches M1 – M4 and a magnification control means (not shown).

The microswitches M1 – M4 are selectively used to detect and determine the starting position of the first mirror 22 and M1 is selected for 1:1, M2 for 1:0.87, M3 for 1:0.82 and M4 for 1:0.71 magnification. The operational example A shows the case where the original should be copied at 1:0.87 magnification starting from the position in which the first mirror 22 is found in its position for 1:1 magnification. In this case, for example, the operator pushes the operation button for 1:0.87 magnification (not shown) arranged on an operation panel (not shown) so as to move the cam 24 of the first mirror in the direction indicated by the arrow. When the cam 24 reaches the microswitch M5, the corresponding actuater is actuated to operate the microswitch M5 which, in turn, causes the reversal of the movement of the mirror 22 as indicated by the arrow. The movement in the reversed direction of the cam 24 with the mirror 22 continues until the cam 24 reaches the microswitch M2 and actuates it to stop the mirror 22. After the pre-running length has been adjusted in this manner, the apparatus is now ready for copying at 1:0.87 magnification.

In the same manner, the apparatus can be shifted from the position for copying at 1:0.71 magnification to that for 1:1 magnifications shown by the arrow in the example B. The arrow in the example C indicates the movement of the cam 24 for the case where the operator cut off the power source due to some cause during the scanning of the original by the first mirror 22 and some time after again put on the source and pushed the operation button for 1:0.82 magnification (not shown). As illustrated, the current from the source makes the cam 24 with the mirror 22 continue scanning until the cam 24 reaches the microswitch M6. The microswitch M6 actuated by the cam 24 reverse the movement of the mirror 22 and now the cam 24 is moved toward the microswitch M3. When the cam 24 contacts with the microswitch M3, it will stop the mirror 22 as ordered by the above mentioned operation button. Thereby the apparatus becomes now ready for copying at 1:0.82 magnification and the mirror 22 can start scanning the original.

In case of the last example D, a copy is made at the same magnification as that for the previous copy cycle. The arrow indicates the movement of the cam 24 for this purpose. When the scanning the original supporting plate has been completed, the microswitch M6 is actuated to reverse the movement of the mirror 22 like as the case of the example C. The reversed cam 24 is again stopped at the same starting position. The function of the microswitch M5 is to shorten the time required for changing the starting position of the first mirror 22. As understood from the foregoing, when the first mirror is positioned in a given starting position, said mirror is stopped always in the same direction of the movement through the reversal by the microswitch M5 or M6. This is because errors in operation of the microswitches can be depressed by doing so. The distance moved by the first mirror 22 and the speed of its movement are determined in accordance with the selected magnification as described above and the pre-running length for the selected magnification can be calculated by the method as described above referring to FIG. 1.

A substantial increase in copying speed will be attained when the first mirror 22 is moved to a given starting position, after reversed by the microswitch M6, at a higher speed than that during scanning by changing the speed of the mirror at its reversal point. In the embodiments described above, there is used a cam with which microswitches and actuators for them are actuated. However, it should be noted that the use of such a cam is by no means essential for the invention. This is only an example of means for determining the pre-running starting position of the mirror. In the art of copying apparatus equipped with a variable magnification system, it is a common practice to position the scanning mirror and the focusing lens for copying at a selected magnification with mechanical positioning means such as cam and microswitch. As well known, in the production of copies with this type of apparatus, there often occurs misalignment of optical system due to inertia forces of the operational members and limited operational accuracy of cam and switch members. When such misalignment has once occurred, degradation of the copy quality is caused, for example, there observed marginal image difference between the original and the copy thereof, obscurity of the copied image and extraordinary distortion of the copied image crosswise of lengthwise. One solution to this problem is that for their stop settings, the stopping of the optical system is always effected at a given position only when it is moved toward the position in the same direction. This solution is very effective to prevent the misalignment of the optical system to its stop position. Accordingly this solution makes it possible to improve the image quality of the copy and also to free the manufacturers from worries about the size of operational members, cam members and the like. The manufacture and adjustment of these members become very easy.

Now, control of the optical system in the above mentioned type of copying apparatus will be explained. In the following examples, the apparatus used comprises the same photosensitive body as the photosensitive drum in FIG. 1 embodiment and has three different magnifications. Although the apparatus is designed not to change the speed of the optical system but to change the peripheral speed of the photosensitive drum in accordance with the selected magnification, it will be obvious that the present invention is applicable for the former type of the apparatus.

Figure 3:
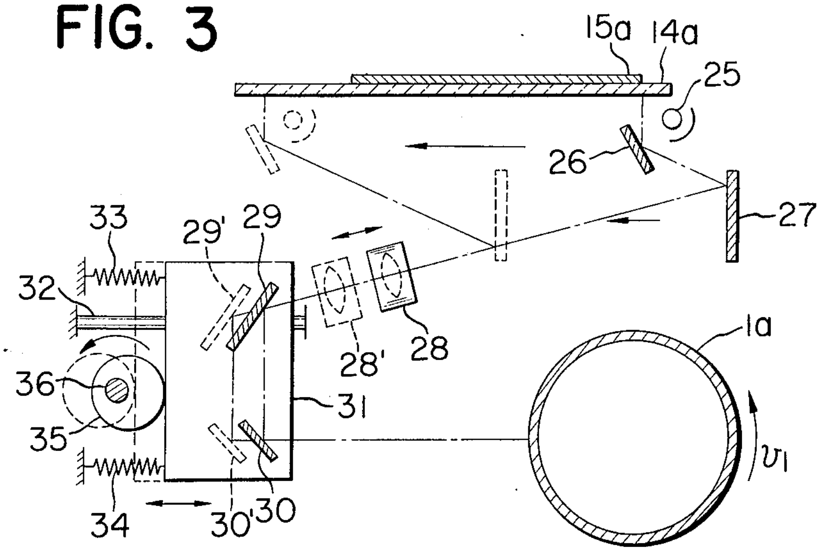
FIG. 3 is a schematic view of essential part of a copying apparatus as shown in FIG. 2 illustrating in particular the operation of optical means.

Referring to FIG. 3, there is shown an arrangement of lens system, mirrors and the like of the apparatus mentioned above. The apparatus is an electrophotography copy machine which comprises a stationary original supporting plate and in which the image of the original document is exposed on a rotating photosensitive body by slit exposure.

In the drawing of FIG. 3, the photosensitive body is designated by 1*a*, the direction of its rotation is indicated by the arrow. An original 15*a* placed on an original supporting plate 14*a* is illuminated by a lamp 25 and exposed onto the surface of the photosensitive drum 1*a* by means of a first mirror 26,a second mirror 27, a lens system 28 having a driving mechanism, a third mirror 29 and a fourth mirror 30. To form a copy image with the apparatus, discharge devices are provided around the drum 1*a* and corona discharge therefrom is used for exposure in the conventional manner. The original supporting plate is made of glass and the lamp 25 illuminating the original 15*a* placed on the glass plate is moved at the rate of $V_1$ together with the first mirror 26. The second mirror 27 is moved at the rate of $V_1/2$ in the same direction as the first mirror 26. The exposure of the original is effected by these mirrors 26, 27, the lens system 28 and the mirrors 29 and 30.

When the original has to be copied at a selected magnification with the apparatus, the first and second mirrors 26 and 27 are shifted in the same manner as the embodiment of FIG. 1 so that their scanning starting positions may come to positions given for the selected magnification and also the lens system 28 is shifted to the position 28', the third mirror 29 and 29' and the fourth mirror 30 and 30' respectively.

The shift of the mirrors 29 and 30 is effected as follows:

The mirrors 29 and 30 are supported by a supporting block 31 which is slidingly movable along a pair of guide rails 32. The supporting block 31 is under the action of a pair of springs 33, 34 which pull the supporting block 31 toward the left-hand side of the plane of the drawing. The positioning of the supporting block 31 is effected by a rotary eccentric cam 35 abutting on the block and keeping it in its position against the pulling force of the springs 33, 34. The eccentric cam 35 is rotated together with its rotary shaft 36. Therefore, by controlling the amount of the rotational motion of the shaft 36 in accordance with the selected magnification, the positions of the mirrors 29 and 30 can be adjusted as desired.

Figure 4:
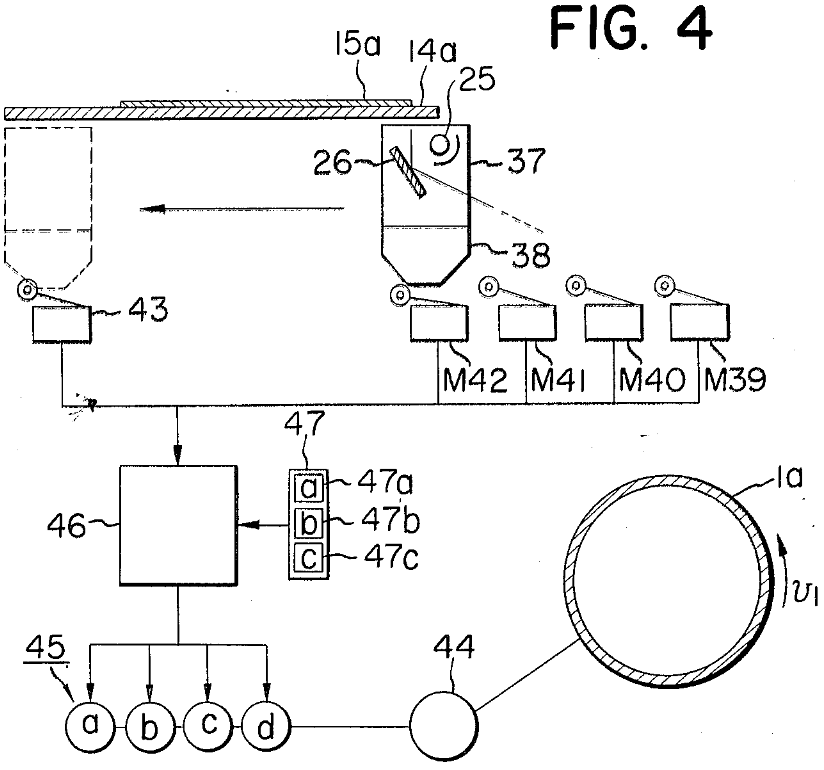
FIG. 4 is a schematic view of positioning mechanism in the apparatus as shown in FIG. 3 showing in particular how to position the first mirror for variation copying.

The control of the operation of the scanning optical system in the above described apparatus is explained referring to FIG. 4. The lamp 25 and the first mirror 26 are supported by a supporting block 37. Fixed on the underside of the supporting block there is a cam 38 to actuate microswitches 39 through 43. The photosensitive drum 1*a*, the supporting block 37 and the second mirror 27 are driven by a motor 47. During the operation time for copying, the motor is rotating at a uniform speed and the operational speed of the scanning optical system is changed by a set of clutches 45. To copy the original, for example, at 1 : 1 magnificaton, one of the clutches, namely the clutch 45*a* is energized so as to move the scanning optical system leftwards by the motor 44 at the same speed as the peripheral speed of the drum 1*a*. On the other hand, for copying at a selected magnification *m* other than 1 : 1 magnification, the first mirror scans the original at a speed of (the peripheral speed of the drum 1*a*) × (1/*m*). The changing in the speed of the scanning optical system is effected by changing the rotational frequency of the motor 44 by the clutch 45.

The microswitches 39, 40 and 41 correspond to the magnification selector buttons 47*a*, 47*b* and 47*c* respectively and are used to determine the starting position of the first mirror 26. When the original is copied at a selected magnification, the speed at which the scanning optical system is moved will change in accordance with the selected magnification, which may cause the copying apparatus to produce a defective copy in which the image of the fore portion of the original is missing. The pre-running of the first mirror 26 eliminates such a trouble. Usually prior to scanning the original, the scanning system is preliminarily moved by some distance, which is called "pre-running" . By this pre-running, the adverse effect of the vibration occured at the start motion of the scanning system can be prevented. However, when variable magnification copying process is carried out, the speed of pre-running changes in accordance with the selected magnification. Therefore it is necessary to compensate the change in pre-running speed by changing the distance of the pre-running (pre-running length) to prevent the produced copy from lacking the image of the fore edge portion of the original due to untimely exposure.

The microswitches M39, M40 and M41 are provided to adjust the above mentioned pre-running length.

The microswitch M42 is a switch for reversing the direction of the movement of the scanning system. Therefore the microswitch M42 functionally corresponds to the microswitch M5 shown in FIG. 1. Also the microswitch M43 is a switch for reversal. This microswitch M43 detects the scanning of the original supporting plate and further produces a signal to reverse the movement of the scanning system when the end of the original supporting plate is detected. When the microswitch M43 is actuated, the clutch 45*d* reverses the motor 44 which, in turn, reverses the scanning system. In the drawing of FIG. 4, reference numeral 46 designates a control circuit part through which the operation of the scanning system is controlled and 47 designates a selector button for magnification *d*. The second mirror 27 is not shown in FIG. 4. The mirror 27 corresponds to the first mirror 26 and is driven by the same driving mechanism as that for the first mirror.

Figure 5:
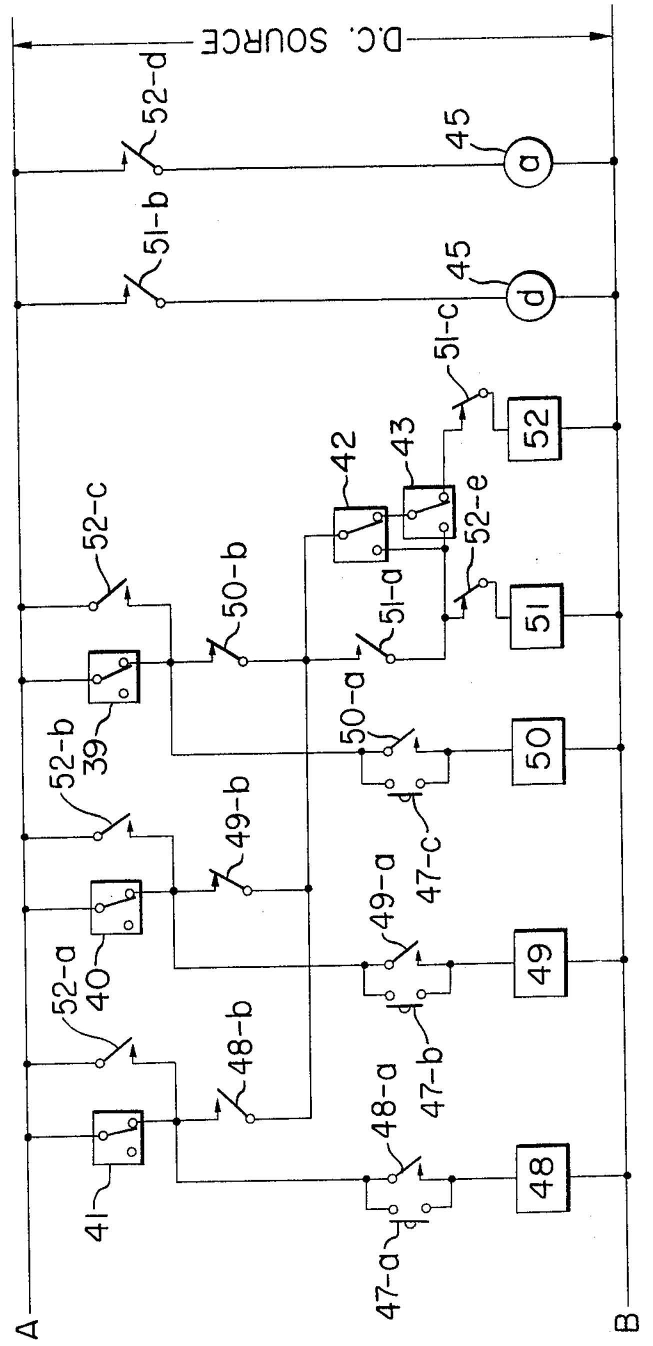
FIG. 5 shows an electric circuit for controlling the scanning system in the copying apparatus shown in FIG. 4.

Now referring to the electric circuit shown in FIG. 5, we explain the operational motion of every part at the time when one of the selector buttons 47*a* – 47*c* shown in FIG. 4 is pushed for a desired magnification. Starting from the position of the apparatus shown in FIG. 4 in which the cam 38 is actuating the microswitch M42, if the selector button 47*a* is depressed, the relay 48 will be thrown in the circuit and hold its position. Thereby the relay 51 is energized by power source A through NC (normal close) relay contact 48-*b* of the microswitch M41 and NO (normal open) relay contact 52-*e* of the microswitch M42. The clutch 45-*d* is operated through the contact 51-*b* and the motor 44 is operatively connected with the supporting block 37 supporting the mirror 26. As a result, the supporting block 37 starts moving toward the right-hand side viewed from the plane of FIG. 4. The shift of the supporting block 37 makes the cam 38 release the microswitch M42, but the contact 51-*a* of the relay 51 holds it. When the microswitch M1 related to the selector button 47*a* is actuated, the relays 48 and 51 are opened so that the optical system may stop.

In case that the cam 38 is in a position rightward distant from the position of the microswitch M42 shown in FIG. 4, the depressing of the selector button 47*b*, after one operation cycle has been complete, will close the relay 49. Then, the electric current flows through NC contact 49-*b* of the microswitch M40, NC contact of the microswitch M42 and NC contact of the microswitch M43, and energizes the relay 52, which causes the clutch 45-*a* to actuate through the contact 52-*d*. As a result, the optical system moves leftward on the drawing of FIG. 4 and when the cam 38 actuates the microswitch M42, the relay 52 opens, the clutch 45-*a* is released and the optical system stops. When NO relay 51 of the microswitch M42 is energized to actuate the clutch 45-*d*, the optical system moves rightwards and the actuation of the microswitch M40 stops it. As to the case where the cam 38 is in a position between the microswitches M42 and M43, the action of the apparatus will be understood by substituting the microswitch M43 for the microswitch M42 with reference to the explanation of the above described case.

As seen from the foregoing, it is of importance to shift the cam 38 to the position of M42 or M43 whenever the cam 38 is in a position on the right-hand side of the microswitch M42 or M43. The scanning of the original by the optical system must be started after it has been shifted to M42 or M43 and further after it has been stopped at the position of one of the microswitches M39 – M41 corresponding to the switch selected by the selector button 47. Furthermore the the stop position must be position in which the selected switch is actuated by the right side cam surface of the cam 38. By doing so, it is assured that the scanning optical system always takes a definite starting position and that coincidence of scanning system and the fore edge portion of the original can be obtained irrespective of the width of the cam which actuates the microswitch.

In practical use of the variable magnification copying apparatus, the apparatus is many times often used for copying at 1 : 1 magnification rather than for copying at any other magnification. Therefore, it is recommendable to always set back the apparatus to its position for 1 : 1 magnification after it has once used to copy at a selected magnification other than 1 : 1 magnification.

If failed to set back the apparatus and when next time man wishes to copy at 1 : 1 magnification, he is apt to make wrong copies with unwished magnification. Such an error may cause considerable loss of copy sheets, in particular, for a high speed copying apparatus.

Figure 6:
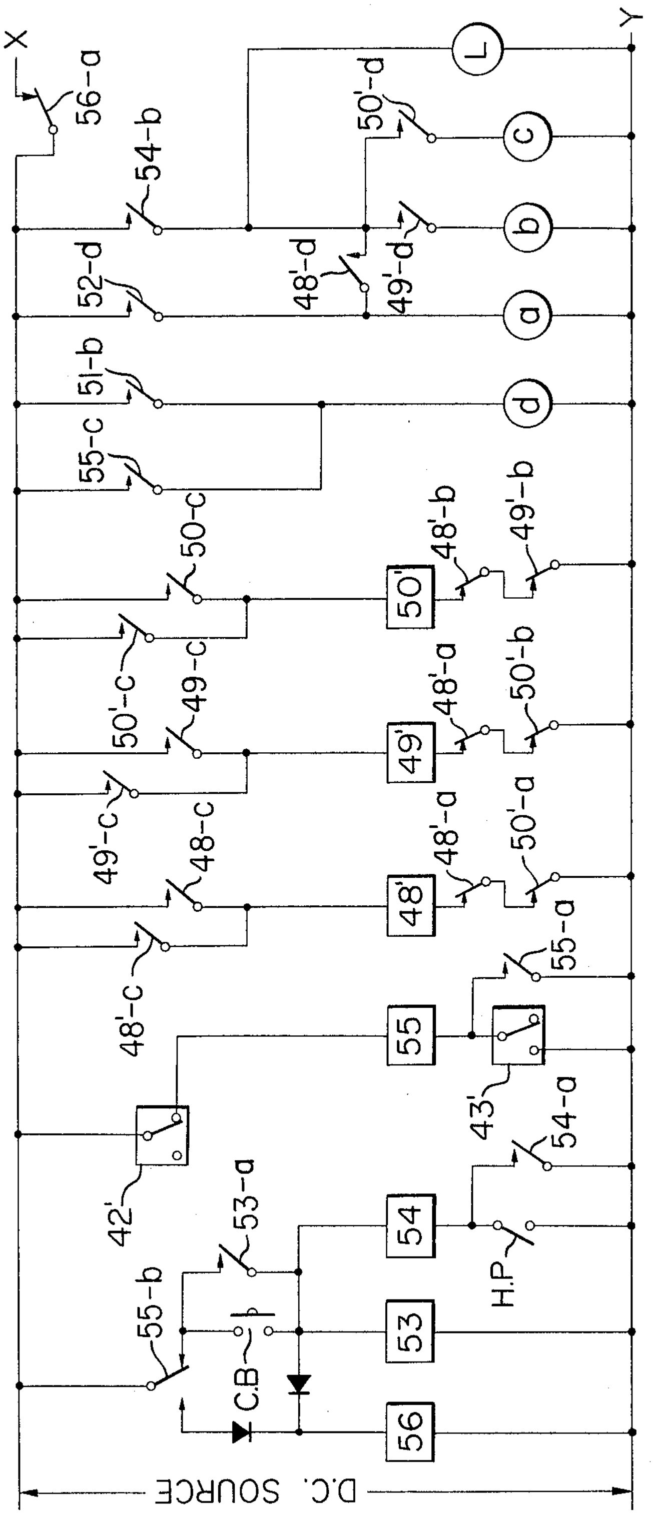
FIGS. 6 and 7 show an electric circuit for automatically setting back a scanning optical system from its position for variation copy to the position for unit copy after one operation of variation copy has been completed.
Figure 7:
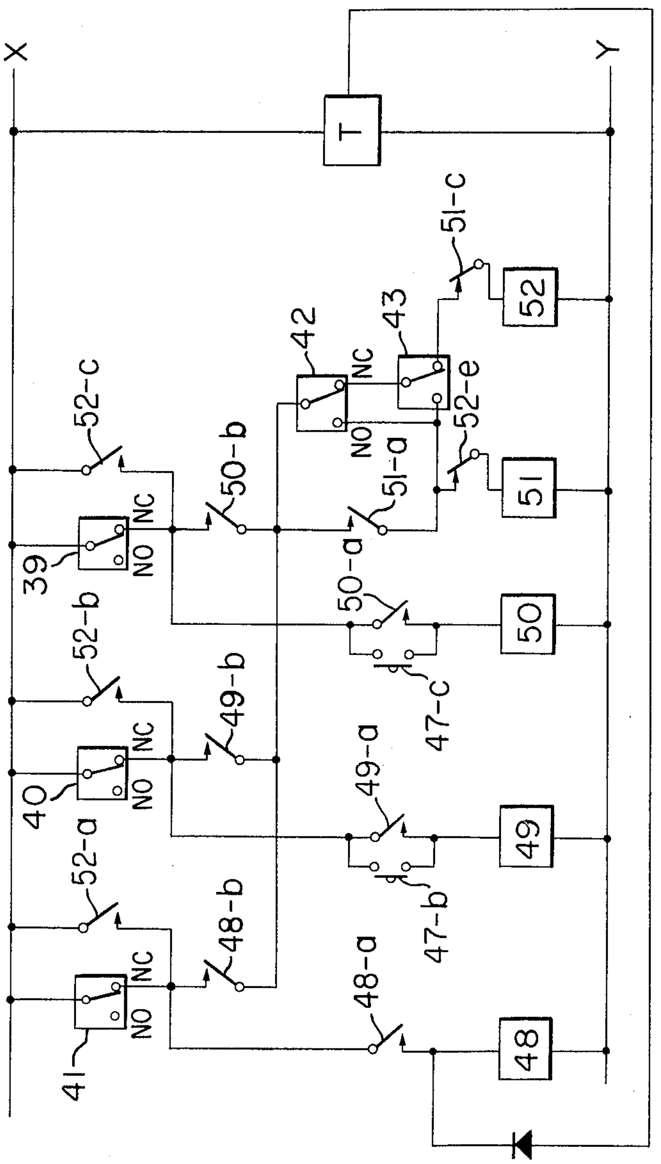

According to the preferred embodiment as shown in FIGS. 6 and 7, the problem is solved by providing the apparatus with means for automatically setting back the apparatus to its position for copying at 1 : 1 magnification after once copied at a selected magnification other than 1 : 1. The apparatus of this embodiment is essentially the same in arrangement of the optical system as that shown in FIG. 3. For simplification of the explanation, the control of the lens system 28 is not explained herein. The difference between this embodiment and the above described embodiments is found in that a set of selector buttons 47 does not include the button 47*a* corresponding to 1 : 1 magnification. Instead of the button 47*a*, the electric circuit shown in FIGS. 6 and 7 contains a timer T the output of which is used like the output of the above mentioned button 47*a*. Applied a voltage to terminal XY, the timer T is actuated after a definite time delay and the output of the timer T is lost after a definite actuation time has elapsed. Therefore by applying a voltage to terminal XY, a signal essentially equal to the signal of the above described selector button 47*a* can be obtained. After the signal has been generated, the apparatus operates in the same manner as that described above. In FIG. 6, CB designates a copying operation button. When the button CB is depressed, relays 53 and 54 are actuated and the contact 53-*a* is closed, which makes the terminal XY cut out from the power source. According to the rotational position of the photosensitive drum, switch HP is cut in to align the fore edge of the original to a given position on the photosensitive body. Then relay 54 is actuated and held through the contact 54-*a*. Relay 48' becomes held through the contact 48-*c* of the relay 48 as soon as DC power source is cut in. Because of the contact 48'-*d* being closed, the clutch 45-*a* is brought in operation and the lamp L is put on for exposure. The first mirror is shifted and thereby the microswitch M 43' is actuated, which microswitch M 43' is arranged in parallel with the above described microswitch M 43 arranged at the reversal position. With the actuation of the microswitch M 43', the relay 55 is closed and thereby the relays 53 and 54 are deenergized. Also, by the contact 54-*b*, the clutch 45-*a* is released from its operation whereas the clutch 54-*d* is brought in operation by the contact 55-*c*. As a result the direction of the movement of the optical system is reveresed. Thereafter, movement of the optical system in the reversed direction continues until the microswitch M42' arranged in parallel the above described microswitch M 42 is actuated. With the actuation of the microswitch M 42', the relay 55 is opened and simultaneously the clutch 45-*d* is released so that the optical system stops. At the same time, the relay 56 is opened to connect terminal XY with the source so that the timer T (hereafter refer to FIG. 7) may start operating. The output of the timer T actuates the relay 48. At the time when the relay 48 is closed and one copy cycle has been completed, the scanning part including the first mirror is in a position in which it actuated the microswitch M 42. Therefore, the scanning optical system must be shifted until it closes the relay 51 and actuates the microswitch M41. In this manner, the lens system as well as the optical system of the scanning part can be set back to the position for copying at 1 : 1 magnification upon the completion of a copying operation even when the copying operation was that for a selected magnification other than 1 : 1.

As described above, when the optical elements of the apparatus such as lens system, mirrors and lamp are moved to make variation copy, the determination of their set position must be made by stopping the optical elements only when they are moving in a definite direction. By doing so, any possible operational error caused by switch actuating members such as the cam may be eliminated to a great extent. It is true that this necessitates the reversion of the movement of the optical part whenever it comes from a direction different from the definite direction. But, switch means arranged for copying at 1 : 1 magnification may also serve as means for reversion and, therefore, the cost involved in such reversion will be fully compensated by the advantage of smooth operation obtainable by it, in view of the frequency of the use of 1 : 1 magnification. Also, as mentioned above, the loss caused by the operator's mistake of selected magnification can be eliminated by automatically setting back the optical elements to their position for copying at 1 : 1 magnification. Here it should be noted that the technical concept of such automatic setting back and the undirectional stop setting method for optical system described above are independent of each other.

All of the above explanations have been made of variable magnification copying apparatus having a stationary original supporting plate or table. In particular, coincidence by "pre-running" for variation copy which is an important feature of the present invention, has been explained referring to FIG. 1 showing the apparatus in which mirror scanning is adopted. The method for adjusting the position of the mirror for variation copy and the mechanism for carrying out it have been explained referring to FIG. 2. Referring to FIGS. 3 and 4, a more concrete apparatus embodying the invention has been explained and an electric control mechanism for the optical system illustrated in FIG. 4 has been explained in detail referring to FIGS. 5 through 7.

Figure 8:
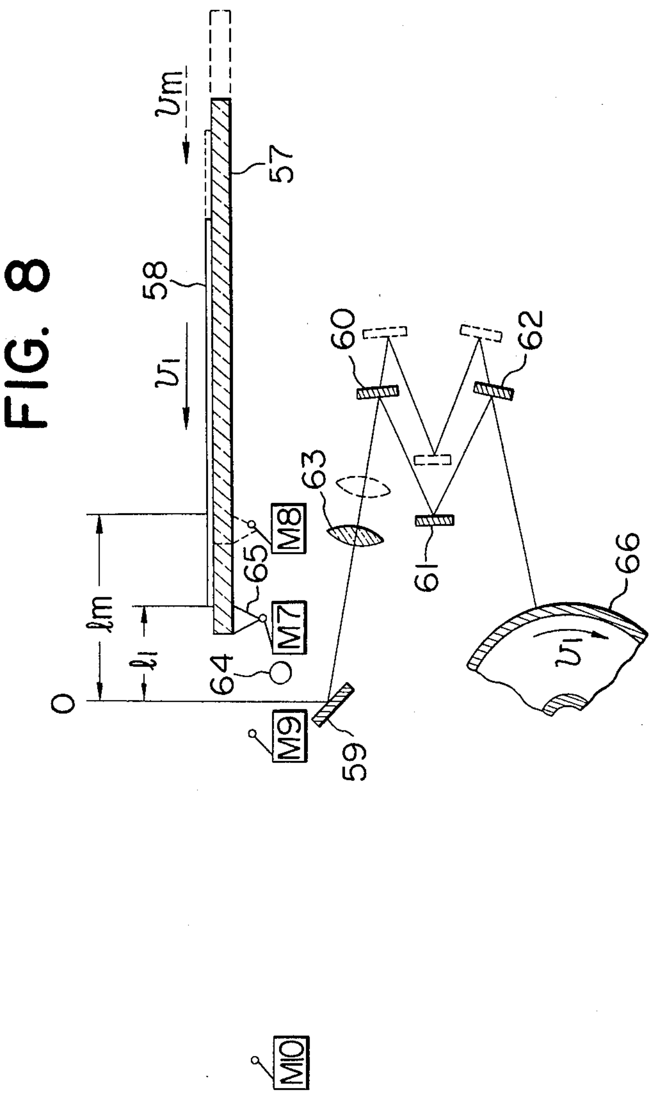
FIG. 8 is a schematic view of the essential part of an apparatus having movable original table showing another embodiment of the invention.

Now referring to FIG. 8 showing the apparatus having a movable original supporting plate, the important feature of the present invention, that is, coincidence by "pre-running" for variation copy will be explained.

In the drawing reference numeral 57 designates an original supporting plate made of glass, 58 is an original, 59 is a stationary mirror, 60 is a first movable mirror, 61 is a second movable and 62 designates a third movable mirror. These movable mirrors are shifted to the positions indicated by phantom line respectively when the original is copied at a selected magnification other than 1 : 1 magnification. 63 designates a lens having a driving mechanism, 64 is a lamp for illuminating the original and 65 is a cam firmly attached to the under side of the original supporting plate. Microswitches M 7 – M 10 are opened and closed by this cam 65.

Reference numeral 66 designates a photosensitive body in the shape of a drum which rotates at a peripheral speed of $V_1$ in the direction indicated by arrow. The original supporting plate is shown in its position for copying at 1 : 1 magnification. The image of the original is exposed on the photosensitive drum 66 while the original plate is moving in the direction indicated by arrow at a speed of $V_1$. In this drawing, position 0 indicates the position of the fore edge of the original and $l_1$ is pre-running length for 1 : 1 magnification. Microswitch M 9 functionally coreesponds to the microswitch M 5 shown in FIG. 2 and M 10 corresponds to M 6 also shown in FIG. 2. When man wishes to make variation copy at 1 : 1 *m* magnification after copying at 1 : 1 magnification, he pushes one operation button for 1 : *m* variation copy (not shown). Then the original supporting plate 57 moves in the direction of arrow until the cam 52 actuates the microswitch M9 to reverse the movement. After reversed, the plate 57 comes back and at the moment when the cam 65 actuates the microswitch M8, it stops. Now, the apparatus can start copying at 1:*m* magnification. Pre-running length in this step is $lm$ and the speed of the original supporting plate is $V_2$. The value of $lm$ is $l_1/m$ and $V_2$ is $V_1/m$.

The speed $V_2$ may be obtained by changing the driving force. Also, the combination of a driving means the rotational frequency of which varies in accordance with the selected magnification and a wire rope for driving the original supporting plate may be used to change the speed of the original supporting plate.

In the above described embodiments, the copying apparatus comprises a photosensitive body on which the image of copy is developed.

Figure 9:
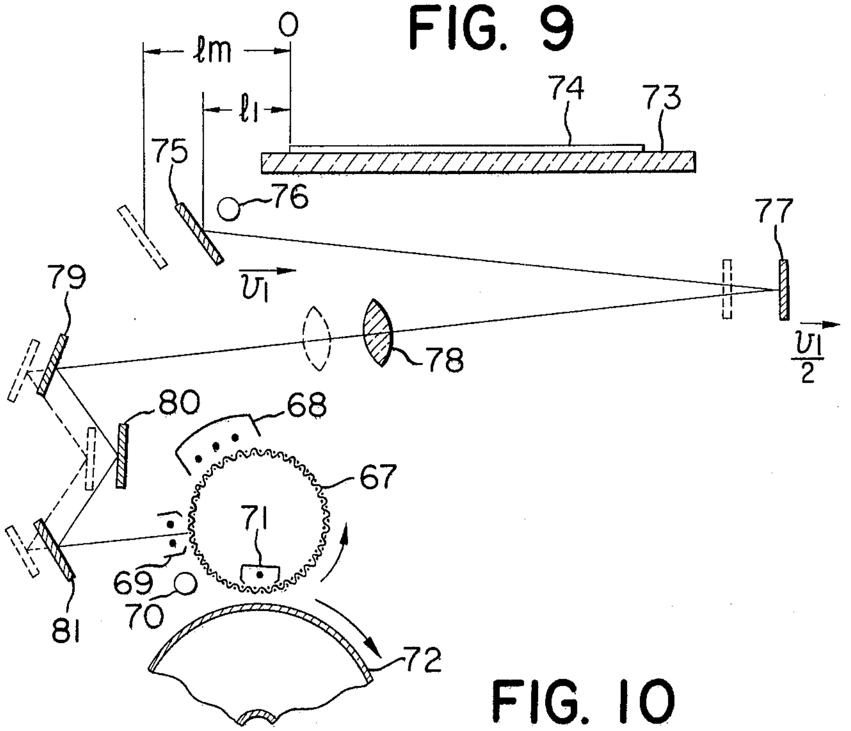
FIG. 9 is a similar view as FIG. 8 but showing another type of copying apparatus in which first latent image is formed at first and then second latent image is formed in accordance with the first one, and a stationary original table is provided.

FIG. 9 shows another type of copying apparatus to which the present invention is applicable. In the apparatus of FIG. 9, a first electrostatic latent image is once formed on a photosensitive body and from the latent image a second electrostatic latent image is formed on other insulating material.

In the drawing of FIG. 9, reference numeral 67 designates a screen photosensitive body (hereinafter referred as screen). The screen is, for example, composed of core electric conductive member, photoconductive material on the core and surface insulating material. It has a plurality of fine openings. A detailed explanation of structure and latent image forming process of such a kind of screen has been made in U.S. Ser. No. 480,280 by the applicant of this application. Therefore, further explanation may be unnecessary.

The screen 67 rotates in the direction of arrow and the first electrostatic latent image is formed on the surface of the rotary screen by first and second corona discharge devices 68 and 69 and a full illumination lamp 70. In the screen 67, there is provided a corona discharge device 71. After the first latent image has been formed, the screen is subjected to ion modulation at the position of the corona discharge device 71 and forms a second electrostatic latent image on the surface of the insulating drum 72 which rotates in the direction of arrow at the same peripheral speed as that of the screen 67. The second electrostatic latent image formed on the insulating drum 72 is developed and transferred to a transfer material in the same manner as the photosensitive drum of FIG. 1 embodiment.

Above the screen 67, there is a stationary original supporting plate 73 which is the same as the stationary original supporting plate of FIG. 1 embodiment. An original 74 placed on the supporting plate 73 is exposed on the screen 67 through first mirror 75, lamp 76, second mirror 77, lens 78 having a driving mechanism, third mirror 79, fourth mirror 80 and fifth mirror 81. The first mirror 75 moves in the direction of arrow at a speed of $V_1$ and the second mirror 77 moves by a distance equal to ½ of the distance the first mirror moves, and at a speed of $V_1/2$.

In order to make a variation copy, the above described optical system is shifted to the position indicated by phantom line. For the apparatus in which ion modulation system or conventional latent image transfer method (TESI method) is adopted, the number of mirrors to be used must be odd number. In the drawing, position 0 indicates the position of the fore edge of the original, $l_1$ is pre-running length for 1:1 copy and $lm$ is prerunning length for variation copy.

As described above, according to the present invention the pre-running length is adjusted in accordance with the selected magnification to prevent the image of the fore edge portion from being missing in the produced copy. Therefore, the invention enables to obtain a high quality copy with a scanning type of variable magnification electronic copying apparatus.

Further advantage of the present invention is that there is no need for controlling the speed of the photosensitive body and the complicate control elements of copy sheet or trnsfer sheet feeding and conveying members. This is because according to the invention, copying at a selected magnification can be done only by changing the speed of the moving original table or the speed of the moving scanning optical system.

In addition to the above advantages, the present invention allows to minimize the trouble caused by unstable motion of the movable part of the apparatus at its starting time. This is of importance in particular for the case where an original is copied at a magnification in negative direction (that is minification). According to the present invention, in this case, the pre-running length is lengthened so that the unstable motion caused by the increase in scanning speed may be depressed.

In the above described embodiments, only a photosensitive body in the form of a drum rotating at a constant speed has been shown and explained. However, the present invention is applicable for copying apparatus provided with other type of photosensitive body such as photosensitive web moving round at a constant speed and photosensitive sheet or plate being moved at a constant speed. As a matter of course, the invention is also applicable for apparatus in which such photosensitive body and the like are changed in speed in accordance with a selected magnification.

As to means for detecting the position of optical system such as mirror and original supporting glass plate, microswitches arranged along the path of their movement have been shown and explained. But it is also possible to use a photoconductive cell in the apparatus so that driving means may be braked with the detection signal from the cell. Position detecting means may be located at any suitable place so long as the place allows to detect the movement of optical system. Optical system moving mechanism such as pulley may be used for this purpose. In the above described embodiments, only the cases where variation for copy is made to minify the image of the original. But the case for which the present invention is applicable is not limited only to such negative magnification cases. In the same manner, the present invention is applicable for variation copy at magnification in positive direction, namely for making a magnified image copy.

Also, means for carrying the original is not limited to glass plate on which original is placed as shown in the drawings. A sheet of original document itself may constitute original carrying means. Further, it is not always necessary to transmit the image of original to the photosensitive body in the form of reflected light. The light transmitted through the original also may be used.

Advantage of unidirectional stop setting and practical arrangement and operational manner for it have been described as to positioning of reflecting means for variation at the time of pre-running. This unidirectional stop setting method can be applied not only for reflecting means but also for positional control of other optical means such as lens system.

Now referring to FIG. 10, method for moving and stopping a lens system in variable magnification copying apparatus and a practical arrangement for carrying out the method will be explained.

In the drawing, reference numeral 82 designates a reversible motor. The motor 82 turns a driving screw 87 connected with the output shaft of the motor. The driving screw 87 is formed as a male screw and engaged with a driven screw 88 formed as a female screw. The driven screw 88 is provided in a portion of a lens supporting member 90. supporting a lens system 89. The upper portion of the supporting member 90 is fitted on a guide rail 91 so that the supporting member 90 may slide along the guide rail when the driving screw is turned by the motor. The slide motion of the supporting member is made in the direction of optical axis. On the under side of the supporting member 90, there is firmly attached a cam 92 by which three microswitches M84, M85, M86 are opened and closed respectively. Reference numeral 93 designates magnification selector button. In this embodiment, there are provided three selector buttons, namely, selector button 93*a* for 1:1 magnification, 93*b* for 1:0.86 and 93*c* for 1:0.71.

Signals produced by the selector buttons 93*a* - 93*c* as well as by the microswitches M84 - M86 are converted, in a control circuit part 83, into signals for effecting normal rotation, reversion and stopping of the motor 82. As to the control circuit part 83, a detailed explanation will be made hereafter referring to FIG. 11.

The operation of the above described lens system driving mechanism is as follows:

For the convenience of explanation, it is assumed that by pushing the selector button 93*b*, the lens system 89 has been located in the position as illustrated in the drawing. Now, if a man pushed the selector button 93*a*, the motor will be started by a signal from the control circuit part 82 to turn the driving screw 87 which, in turn, will drive the supporting member 90 through the driven screw 88. As a result, the lens system 89 begins moving rightwards on the plane of the drawing. The cam 92 is also moved in the same direction and some time after the cam actuates, with its right side cam surface B, the microswitch M84.

A signal generated by the microswitch M84 is introduced in the control circuit 83 so as to stop the motor 82. When the motor is stopped, an electric brake is actuated to prevent the motor from over-running by inertia force. Thereby the lens system 89 is stopped at a definite position. Here it should be noted that when the selector button 93*a* is pushed, the lens system 89 and the cam 92 are always moved until the cam 92 actuates the microswitch M84 and that the actuation of the microswitch M84 is always effected by the right side cam surface B. This is very important to stop the lens system always at a same definite position accurately so that a well focussed image may be obtain every time.

When the selector button 93*c* is pushed after the above operation, the selector button 93*c* returns back in its starting position and through the control circuit 83 the motor 82 is started but in reveresed direction. Therefore, the lens system 89 moves leftwards together with the cam 92 starting from the position corresponding to the microswitch M84. The lens system 89 passes over the position of the microswitch M85 and continues moving until the cam 92 actuates the microswitch M85. Thereby the motor 82 is stopped and, therefore, the lens system is positioned in a definite position.

As clearly seen from the drawing, the actuation of the microswitch M86 is effected by the left side cam surface A of the cam 92. In this manner, when the selector button 93*c* is pushed, the lens system is stopped always at a same definite position.

Now, pushing of the selector button 93*b* will cause the microswitch 93*c* to return back and through the control circuit 83 the motor to start in reversed rotational direction. The lens system 84 moves now from the position of the microswitch M86 towards the microswitch M84. In the course of this movement, the cam 92 actuates the microswitch M85. But the motor 82 continues rotating and when the cam 92 actuates the microswitch M84, the motor is reversed by a signal from the microswitch M84. Thereby, the lens system 83 is now moved leftwards on the plane of the drawing and stopped when the cam 92 actuates the microswitch M85 with its left side cam surface A, so as to stop the motor 82. In this manner, in case that a man pushes the selector button 93*b*, the lens system can be stopped only when the left side cam surface A actuates the microswitch M85. This unidirectional stop setting of optical system such as focusing lens system is very useful for variation copy. Errors in positioning caused by the configuration of switch actuating member such as cam as well as by the operational error of the switch itself are almost eliminated and it is assured that always clear and high quality image can be obtained even when optical system is displaced for variation copy.

Figure 11:
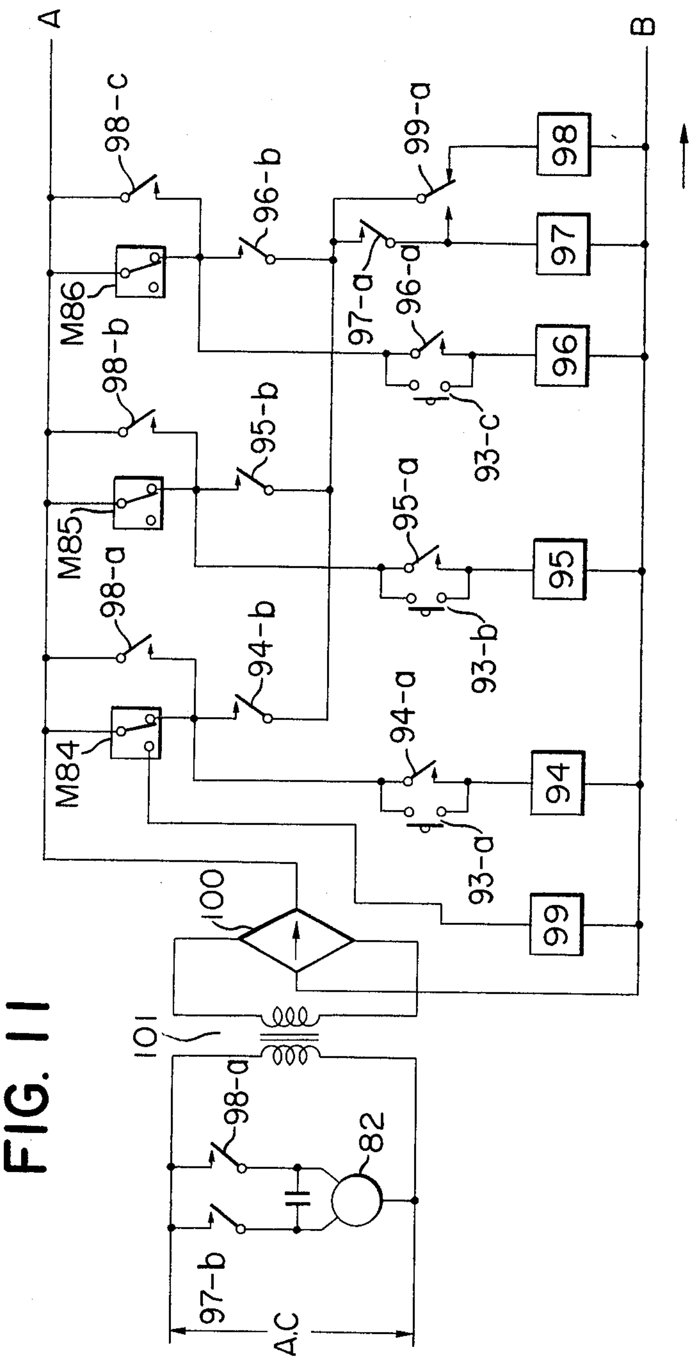
FIG. 11 shows a circuit for operating the mechanism shown in FIG. 10.

Now referring to FIG. 11, the control circuit 83 will be explained.

The motor 82 is a reversible motor. When the contact *a* of a relay 98 is closed, the motor 82 rotates clockwise, which causes the lens system 89 to move rightwards. On the contrary, when the contact *b* of a relay 97 is closed, the motor 82 rotates counterclockwise and then the lens system 89 is moved leftwards. Reference numeral 101 designates a transformer which has an input of 100 V and an output of 18 V, and which serves as a power source for the control circuit, with its DC voltage of 24 l V taken from a bridge diode 100.

Figure 10:
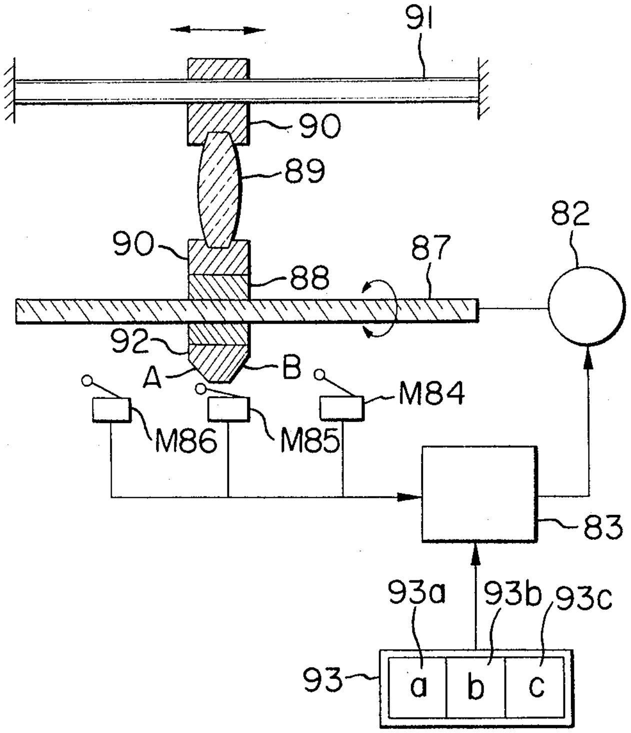
FIG. 10 is a schematic view of a driving mechanism for lens member in the variation optical system illustrating the manner how to move and stop the lens mmember.

For the purpose of explanation it is assumed that starting from the position shown in FIG. 10, the selector button 93*a* is now pushed. In the starting position, the microswitch M84 is on its NC (normal close) side. Therefore, by pushing the selector button 93*a*, relays 94-*a* and 94-*b* are closed and relay 94 is held in operation. At this point, also relay 98 is energized to close the contact 98-*a*. Thereby the motor 82 rotates clockwise and the cam 92 is moved rightwards on the plane of the drawing, FIG. 10.

Upon the time when the cam 92 actuates the microswitch M84, the relays 94 and 98 are deenergized and therefore the motor 82 stops. The lens system 89 comes to a halt at the position in which the right side cam surface B (FIG. 10) actuates the microswitch.

In the next place, by depressing the selector button 93*b*, relay 95 is actuated and it is held in operation by relay 95-*b* now closed. As long as the microswitch M84 is not actuated by the cam 92, relay 98 is actuated through the microswitch M85 and the relays 95-*b* and 99-*a*. As a result the motor starts rotating clockwise and the lens system is moved rightwards on the plane of the drawing FIG. 10 until the cam actuates the microswitch M84. Upon the actuation of M84, relay 99 is thrown in the circuit and the relay 99-*a* is actuated so that the relay 99 is turned over from NC to NO (normal open) side. As the relay 98 opens and the relay 97 is thrown in the circuit, the motor 82 reverses its rotational direction to rotate counterclockwise. Therefore, the lens system 89 is now moved leftwards. At this time, the microswitch 84 is turned over from NO to NC side. But, through the contact 97-*a* and the microswitch M85, the relay 97 is maintained in its closed position and therefore the motor continues rotating counterclockwise, by which the lens system is further moved leftwards. Only when the microswitch M85 is actuated by the cam 92, the relay 97 opens so as to stop the motor 82 and the relay 95 is also opened.

When the selection button 93*c* is pushed following the above operation, the relays 98 and 96 are actuated so that the contact 98-*a* closes and the motor 82 starts rotating clockwise. Thereby the cam 92 accompanied by the lens system 89 is moved rightwards until the cam actuates the microswitch M84. Upon the actuation of the microswitch M84, the relay 99 is closed so that the motor 82 is reversed. Now the cam 92 is moved leftwards until it actuates the microswitch M86. By the actuation of the microswitch M86, the relay is opened, the motor 82 is stopped and the relay 97 is also opened.

The variation of original image in optical scanning direction and in vertical direction is usually effected by changing the position of lens system and, if it is required, also by changing the optical length. In such a case, the unidirectional stop setting of optical system described above brings forth various advantages. It permits always an accurate positioning of the lens system since errors caused by the width of switch actuating member such as cam are prevented. According to the method, it is no longer necessary to worry about the accuracy of focussed image and the width of cam and the like. Therefore, their manufacture and adjustment become easy.

While the invention has been particularly shown and described with reference to preferred embodiments thereof, it will be understood by those skilled in the art that the foregoing and other change in form and details can be made without departing from the spirit and scope of the invention.

What we claim is:

1. A variable magnification optical mechanism is an image forming apparatus in which a varied image at a selected magnification (m) of an original image is formed, which mechanism comprises:

(a) a photosensitive member which moves through a position in which it is exposed to a light image of the original, wherein said movement occurs at least at every exposure time at a definite speed (v) irrespective of the selected magnification, (b) driving means for providing a driving force at a predetermined speed ratio corresponding to the selected magnification, and (c) optical scanning means driven by said driving means for scanning the original to expose said photosensitive member to the light image of the original at a speed ratio of $(v/m)$, said optical means changing its pre-running length, that is a distance from its starting position for image forming to the substantially exposed fore edge of the original, to $(l/m)$, where $l$ is a pre-running length at *a* magnification $m$ equal to 1.

2. A variable magnification optical mechanism as claimed in claim 1, wherein said optical means comprises a stationary original supporting plate on which the original is placed, means for illuminating the original on the stationary original supporting plate, and a scanning mirror for transmitting the image of the original to said photosensitive member.

3. A variable magnification optical mechanism as claimed in claim 2, wherein said scanning mirror scans at least the full length of the original for image forming at 1 : 1 magnification, wherein said optical scanning means further includes a second mirror which moves in correspondence with the movement of said scanning mirror, and wherein for image forming at a selected magnification $m$, the pre-running length $l$ of said scanning mirror is changed at the ratio of $l/m$, and the scanning speed is changed in accordance with the selected magnification $m$.

4. A variable magnification optical mechanism as claimed in claim 2 in which said scanning mirror scans at least the full length of the original, and further comprising a second mirror moving at a speed equal to ½ of the speed of said scanning mirror and in the same direction as the scanning mirror, wherein for image forming at a selected magnification *m*, the pre-running length *l* of said scanning mirror is changed at the ratio of *l/m*, the pre-running length of said second mirror is changed by ½ of said changed length of said scanning mirror, the scanning speed of said scanning mirror is changed in accordance with the selected magnification *m* and the scanning speed of said second mirror is changed by ½ of said changed speed of the scanning mirror.

5. A variable magnification optical mechanism as claimed in claim 2, wherein the adjustment of the starting position of said scanning mirror required for image forming at variable magnification is effected by stopping said mirror at a predetermined position only when said mirror has been moved to the said predetermined position in a definite direction.

6. A variable magnification optical mechanism as claimed in claim 5, wherein said mirror moves along a guide rail to scan the original, and further comprising microswitch means provided on the apparatus and an actuation member provided on the mirror for actuating said microswitch means to detect the starting position of said mirror for an image formation at a selected magnification.

7. A variable magnification optical mechanism as set forth in claim 2, wherein said optical scanning means further comprises a second mirror with relation to the movement of said scanning mirror.

8. A variable magnification optical mechanism as set forth in claim 2, wherein said electrophotographic photosensitive body is in the form of a rotatable drum.

9. A variable magnification optical mechanism as set forth in claim 2, wherein said illuminating means moves with said scanning mirror.

10. A variable magnification optical mechanism as set forth in claim 2, wherein the starting position of said original supporting plate is adjusted in accordance with the selected magnification, and wherein said original supporting plate is stopped at a position corresponding to the selected magnification only when said original supporting plate is moved to the stop position in a predetermined direction.

11. A variable magnification optical mechanism as claimed in claim 1, wherein said optical scanning means comprises a movable original supporting plate on which an original is placed, means for illuminating the original on said movable original supporting plate, and a substantially stationary reflecting means having a variator means for transmitting the original image by said illuminating means to the photosensitive member, the image of the original on said movable original supporting plate being transmitted to said photosensitive member through said reflecting means and said variator means.

12. A variable magnification optical mechanism as claimed in claim 11, wherein said movable original supporting plate is driven by said driving means in accordance with said pre-running length relationship.

13. A variable magnification optical mechanism in an image forming apparatus in which a varied image at a selected magnification (*m*) of an original image is formed, which mechanism comprises:

(a) a photosensitive body in the form of a rotatable drum for movement at least at every exposure time through a position in which the original is exposed, and at a predetermined peripheral speed (v) irrespective of the selected magnification (*m*), (b) a stationary original supporting plate on which the original is placed, (c) means for illuminating the original on said original supporting plate, (d) driving means for providing a driving force in a speed ratio corresponding the selected magnification (*m*), and (e) a scanning mirror driven by said driving means for transmitting the original image to said photosensitive body, wherein said mirror is driven at a speed ratio of *v/m*, and means for changing the pre-running length (*l*) of said scanning mirror, that is the distance from its starting position to a substantially exposed fore edge of the original, according to the ratio (*l/m*), wherein said ratio is established for image forming at 1 : 1 magnification.

14. A variable magnification optical mechanism in an image forming apparatus in which a varied image at a selected magnification (m) of an original image is formed, which mechanism comprises:

(a) a photosensitive body in the form of a rotatable drum for movement at least at every exposure time, through a position in which the original is exposed, and at a predetermined peripheral speed (v) irrespective of the selected magnification (m), (b) driving means for providing a driving force in a speed ratio corresponding to the selected magnification, (c) a movable original supporting plate on which the original is placed and which is driven by said driving means at a speed ratio of v/m when a varied image at the selected magnification *m* is formed, and (d) stationary illuminating means for illuminating the original on said movable original supporting plate, and means for changing the pre-running length (*l*) of said movable original supporting plate at a ratio of $l_1/m$ wherein *l* is a distance from the starting position of said movable original supporting plate to the substantially exposed fore edge of the original, and $l_1$ is the valve of *l* at 1 : 1 magnification.

15. A variable magnification optical mechanism as set forth in claim 14, wherein microswitch means are provided on the apparatus, and an actuating member is provided on said plate for actuating the microswitch means, to detect the starting position for image formation during said movement of said original supporting plate.

16. A variable magnification optical mechanism as set forth in claim 14, wherein said electrophotographic photosensitive body is in the form of a rotatable drum.

17. A variable magnification optical mechanism as set forth in claim 14, wherein the starting position of said original supporting plate is adjusted in accordance with the selected magnification, and wherein said original supporting plate is stopped at a position corresponding to the selected magnification only when said original supporting plate is moved to the stop position in a predetermined direction.

18. A variable magnification optical mechanism in an image forming apparatus in which a varied image at a selected magnification (m) of an original image is formed, which mechanism comprises:

(a) a photosensitive member which moves through a position in which it is exposed to a light image of the original, wherein said movement occurs at least at every exposure time and at a predetermined speed (v) irrespective of the selected magnification, (b) driving means for providing a driving force at a predetermined speed ratio corresponding to the selected magnification, and (c) optical scanning means, driven by said driving means, for scanning the original to expose said photosensitive member to the light image of the original at the selected magnification, and means for changing the pre-running length of the optical scanning means, that is a distance from its starting position to a substantially exposed fore edge of the original, to a length corresponding to the selected magnification.

* * * * *

UNITED STATES PATENT AND TRADEMARK OFFICE

CERTIFICATE OF CORRECTION

PATENT NO. : 4,080,062

DATED : March 21, 1978

INVENTOR(S) : A. Torigai, et al.

It is certified that error appears in the above-identified patent and that said Letters Patent are hereby corrected as shown below:

Column 1, line 55, change "prerunning" to read --pre-running--.

Column 2, line 54, change "adrupt" to read --abrupt--.

Column 3, line 38, change "mmem-" to read --mem- --.

Column 4, line 40, change "ducument" to read --document--;

line 48, change "$t = {}_1/V_1$" to read --$t = l_1/V_1$--;

line 49, delete ")";

line 51, after "$V_2/2$" insert --)--;

line 52, change "$l_1m$" to read --$l_1/m$--.

Column 7, line 34, change "and" (first occurrence) to read --to--;

line 35, change "and" to read --to--.

Column 9, line 33, delete "the" (second occurrence);

line 34, before "position" insert --the--.

Column 10, line 30, change "reveresed" to read --reversed--.

UNITED STATES PATENT AND TRADEMARK OFFICE
CERTIFICATE OF CORRECTION

PATENT NO. : 4,080,062

DATED : March 21, 1978

INVENTOR(S) A. Torigai, et al.

It is certified that error appears in the above-identified patent and that said Letters Patent are hereby corrected as shown below:

Column 11, line 47, change "coreesponds" to --corresponds--;

line 52, change "1:1m" to read --1:m--.

Column 12, line 55, change "prerunning" to --pre-running--;

line 66, change "trnsfer" to read --transfer--.

Column 13, line 65, change "." (first occurrence) to read --,--.

Column 14, line 21, change "a man" to read --an operator--; and change "93a" to read --93c--;

line 23, change "82" to read --83--;

line 36, change "93a" to read --93c--;

line 43, change "93c" to read --93a--;

line 46, change "reveresed" to read --a reversed--;

line 51, change "M85" to read --M86--;

line 57, change "93c" to read --93a--;

line 60, change "93c" to read --93a--.

UNITED STATES PATENT AND TRADEMARK OFFICE

CERTIFICATE OF CORRECTION

PATENT NO. : 4,080,062

DATED : March 21, 1978

INVENTOR(S) : A. Torigai, et al.

It is certified that error appears in the above-identified patent and that said Letters Patent are hereby corrected as shown below:

Column 15, line 5, change "in case that a man" to read --when an operator--;

line 26, change "24 lV" to read --24 V--.

Column 16, line 28, change "is an" to read --in an--.

Column 17, line 25, change "actuation" to read --actuating--.

Signed and Sealed this

*Twenty-first* Day of *November 1978*

[SEAL]

*Attest:*

RUTH C. MASON
*Attesting Officer*

DONALD W. BANNER
*Commissioner of Patents and Trademarks*